United States Patent
Aragiri

(10) Patent No.: US 9,576,704 B2
(45) Date of Patent: Feb. 21, 2017

(54) WIRE HARNESS WATERPROOF STRUCTURE

(71) Applicant: Sumitomo Wiring Systems, Ltd, Suzuka (JP)

(72) Inventor: Shota Aragiri, Mie (JP)

(73) Assignee: Sumitomo Wiring Systems, Ltd., Yokkaichi, Mie (JP)

(*) Notice: Subject to any disclaimer, the term of this patent is extended or adjusted under 35 U.S.C. 154(b) by 0 days.

(21) Appl. No.: 15/060,940

(22) Filed: Mar. 4, 2016

(65) Prior Publication Data

US 2016/0260523 A1    Sep. 8, 2016

(30) Foreign Application Priority Data

Mar. 5, 2015  (JP) .................................. 2015-043283

(51) Int. Cl.
| | | |
|---|---|---|
| H02G 15/08 | (2006.01) | |
| H01B 7/282 | (2006.01) | |
| B60R 16/02 | (2006.01) | |
| H01B 7/00 | (2006.01) | |
| H02G 15/18 | (2006.01) | |

(52) U.S. Cl.
CPC ........... *H01B 7/282* (2013.01); *B60R 16/0215* (2013.01); *H01B 7/0045* (2013.01); *H02G 15/18* (2013.01)

(58) Field of Classification Search
USPC ....................................... 174/75 R, 84 R, 85
See application file for complete search history.

(56) References Cited

U.S. PATENT DOCUMENTS

| | | | | |
|---|---|---|---|---|
| 4,314,092 A | * | 2/1982 | Fleming ................... | H02G 1/14 156/49 |
| 4,532,164 A | * | 7/1985 | Claunch, II ......... | B29C 61/0625 156/49 |
| 4,647,719 A | * | 3/1987 | Campbell ............ | H02G 15/117 156/48 |
| 4,692,564 A | * | 9/1987 | Campbell ............ | G02B 6/4447 174/76 |
| 4,954,670 A | * | 9/1990 | Jensen ................ | B29C 61/0625 174/92 |

(Continued)

FOREIGN PATENT DOCUMENTS

| | | |
|---|---|---|
| EP | 2161787 A1 | 3/2010 |
| JP | H07-245842 A | 9/1995 |

(Continued)

*Primary Examiner* — Steven T Sawyer
(74) *Attorney, Agent, or Firm* — Dinsmore & Shohl LLP

(57) ABSTRACT

A wire harness waterproof structure is provided that allows the water sealant to be visually checked, enables reliably filling of the periphery of a splice portion with the water sealant, and enables water in an unfilled region to easily drain. The wire harness waterproof structure includes electrical lines forming an intermediate splice portion, an exterior member surrounding the entire circumference of the intermediate splice portion and adjacent end portions, and a curing layer made up of a water sealant wherein a gap between the intermediate splice portion and the exterior member is filled. The waterproof sheet material is curved so as to surround the splice portion and the adjacent end portions. The sheet material has seeping holes allowing a portion of the curing layer to seep, and enable moisture to be drained to the outer surface in a region not filled with the water sealant.

4 Claims, 5 Drawing Sheets

(56) References Cited

U.S. PATENT DOCUMENTS

| | | | | |
|---|---|---|---|---|
| 5,399,810 A * | 3/1995 | Hayami | ................... | H01R 4/70 156/49 |
| 2011/0083899 A1* | 4/2011 | Mori | ................... | B60R 16/0215 174/72 A |
| 2013/0175069 A1* | 7/2013 | Katou | ...................... | H01R 4/70 174/113 R |

FOREIGN PATENT DOCUMENTS

| JP | 2007-141517 A | 6/2007 |
|---|---|---|
| JP | 2012-080633 A | 4/2012 |

* cited by examiner

WIRE HARNESS WATERPROOF STRUCTURE

CROSS-REFERENCE TO RELATED APPLICATIONS

This application claims priority to Japanese Patent Application No. JP2015-043283 filed Mar. 5, 2015.

FIELD OF THE INVENTION

The present invention relates to a wire harness waterproof structure, and in particular relates to a wire harness waterproof structure that is favorable for an intermediate splice portion of a wire harness.

BACKGROUND OF THE INVENTION

In a wire harness installed in a vehicle such as an automobile, it is common to form a splice portion by partially stripping away the coverings of insulated sheathed electrical lines to partially expose the conductors (core lines) made up of conductor element wires, and then join the exposed conductor portions using a crimping terminal or ultrasonic welding. Also, in the case where waterproofing is required, such as the case where the splice portion is arranged in a water-exposed region in a vehicle, a waterproof structure that prevents corrosion of the splice portion is provided.

As a conventional waterproof structure of this type, there is known to be, for example, a waterproof structure in which tape with a thermal foaming adhesive material applied thereon is wrapped around a pair of sheathed end portions on the trunk line side from which the covering in an intermediate portion has been stripped and a sheathed end portion on the branch line side that is to be joined to the intermediate portion, and a waterproof sheet is cylindrically wrapped around and adhered to the sheathed end portions and the splice portion from the outside (e.g., see JP H7-245842A).

Also, there is known to be a technique in which the exposed conductor portions in intermediate portions of a pair of insulated sheathed electrical lines are joined together, a water sealant is applied around them, then the splice portion is covered with a flexible and light-permeable protective sheet, and the water sealant is brought into close contact with the periphery of the splice portion by applying appropriate tensile force to the protective sheet, for example, while causing the protective sheet to following the contraction during the light curing of the water sealant (e.g., see JP 2012-80633A).

JP H7-245842A and JP 2012-80633A are examples of related art.

However, in the former conventional wire harness waterproof structure that uses tape with a thermal foaming adhesive material applied thereon as described above, there is an unresolved issue in that if the amount of thermal foaming adhesive material is too high, it is likely to leak out from the two end portions of the cylindrical waterproofing sheet, but if the amount of thermal foaming adhesive material is too low, it is not possible for the thermal foaming adhesive material to reach the splice portion side.

Also, in the latter conventional wire harness waterproof structure in which a flexible protective sheet is used and caused to follow the deformation during curing of the water sealant, there is an unresolved issue in that even if the protective sheet is light-permeable, it is not possible to easily visually check from outside the protective sheet whether or not the water sealant has reliably penetrated into the spaces between the element wires, for example, or whether or not the water sealant has penetrated into the spaces between the end portions of the covering and the core line made up of a group of conductor element wires.

For this reason, conventionally, unless the waterproofing section in the vicinity of the splice portion is lengthened and the water sealant filling amount is set high, there is a possibility of water entering the splice portion in the case where the splice portion is arranged in a water-exposed area in the vehicle, for example. Also, it has not been possible to avoid the issue that once water has entered the splice portion covered by the waterproofing sheet, it is difficult for the water to be drained.

The present invention was achieved in order to solve conventional issues such as those described above, and an object thereof is to provide a wire harness waterproof structure that enables the water sealant filling state in the periphery of the splice portion to be easily visually checked from outside the protective sheet or the like, that enables reliably filling the periphery of the splice portion with the water sealant without using a large amount of water sealant, and also enables water that has entered an unfilled region to be easily drained.

SUMMARY OF THE INVENTION

In order to achieve the above object, a wire harness waterproof structure according to the present invention is a wire harness waterproof structure including: a plurality of electrical lines each having an insulated covered portion insulated by a covering and an exposed conductor portion obtained by partially stripping away the covering, the plurality of electrical lines form a splice portion defined by the exposed conductor portions being joined together; an exterior member that surrounds the entire circumference of the splice portion and a plurality of adjacent end portions of the coverings that are adjacent to the splice portion; and a curing layer made up of a water sealant with which a gap between the splice portion and the exterior member is filled, wherein the exterior member is formed by a waterproof sheet material that is curved so as to surround the splice portion and the adjacent end portions of the coverings, and the sheet material has a plurality of seeping holes that penetrate in a thickness direction with a predetermined pitch, and are open so as to allow a portion of the curing layer to exist at points on an outer surface in a region filled by the water sealant, and enable moisture to be drained to the outer surface in a region not filled by the water sealant.

According to this configuration, by viewing the water sealant that has seeped so as to exist at points on the outer surface of the exterior member according to the water sealant filling state in the periphery of the splice portion of the wire harness, it is possible to easily visually check the water sealant filling state from the outside. Moreover, even if water enters the region not filled with the water sealant, it can easily drained through the seeping holes. Also, the viscosity, curing speed, and the like of the water sealant, as well as the thickness of the sheet material that defines the diameter of the seeping holes and the length of the seeping holes, are set appropriately such that the water sealant is compressed with a predetermined filling pressure or more due to tensile force or the like during wrapping of the sheet material so as to seep toward the outer surface side of the exterior member, and in this case, it is possible to reliably fill the periphery of the splice portion with the water sealant without using a large amount of water sealant.

In the above wire harness waterproof structure according to the present invention, it is preferable that the sheet material is constituted by a shape-memory resin that is formed in a final shape in which the plurality of seeping holes are open at a molding temperature greater than or equal to a glass transition point, and returns from a material shape, which is a remembered shape in which the seeping holes are closed in a shape memory temperature region lower than the molding temperature, to the final shape in the exterior member.

According to this configuration, when the sheet material is wrapped around the splice portion of the electrical lines, the material shape in which the seeping holes are closed is maintained, and then upon reaching the stage at which appropriate pressure is applied to the water sealant from the sheet material side, the sheet material is heated to a temperature at which it can return to the final shape, and the seeping holes are opened. Accordingly, the filling state in which the water sealant penetrates the gaps between the element wires constituting the conductors and the gaps between the conductors and the coverings can also be visually checked based on the seeping state of the water sealant.

In the above wire harness waterproof structure according to the present invention, it is preferable that the splice portion of at least one electrical line among the plurality of electrical lines is arranged in an intermediate portion in a length direction of the at least one electrical line.

In this case, the water sealant filling state can be easily checked from the outside when waterproofing the splice portion in the intermediate portion of the wire harness, water that has entered the region not filled with the water sealant can be easily drained through the seeping holes, and waterproofing can be performed reliably.

According to the present invention, it is possible to provide a wire harness waterproof structure that enables the water sealant filling state in the periphery of the splice portion to be easily visually checked from outside the exterior member or the like, that enables reliably filling the periphery of the splice portion with the water sealant without using a large amount of water sealant, and also enables water that has entered an unfilled region to be easily drained.

DETAILED DESCRIPTION OF THE PREFERRED EMBODIMENTS

The following describes an embodiment for carrying out the present invention.

FIGS. 1 to 4 show the configuration of an embodiment of a wire harness waterproof structure according to the present invention. In the present embodiment, the present invention is applied to a waterproof structure for waterproofing an intermediate splice portion, in which a conductor connection portion located in an intermediate portion of an electrical line in the length direction is joined to the exposed conductor portion of an end portion of another electrical line, in the case where the intermediate splice portion is arranged in a water-exposed region in a vehicle. Of course, the present invention is also applicable to an intermediate splice portion in which the conductor connection portions in intermediate portions of multiple insulated sheathed electrical lines are joined to each other.

First, the configuration of the present embodiment will be described.

Figure 1:
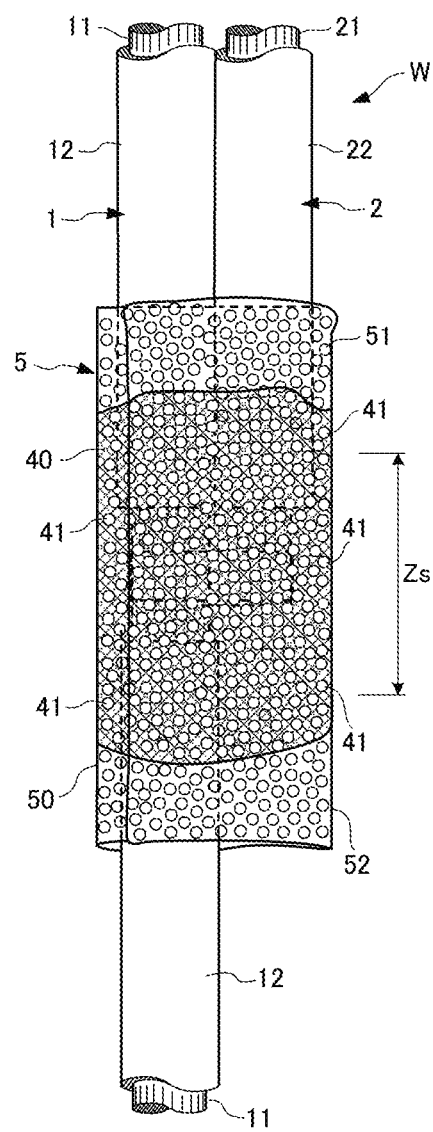
FIG. 1 is a front view of a relevant portion of a wire harness waterproof structure according to an embodiment of the present invention, and shows a state in which a sheet material has been wrapped around a waterproofing section of an electrical line so as to surround a splice portion, and multiple seeping holes are open in the sheet member so as to allow seeping of the water sealant.
Figure 2:
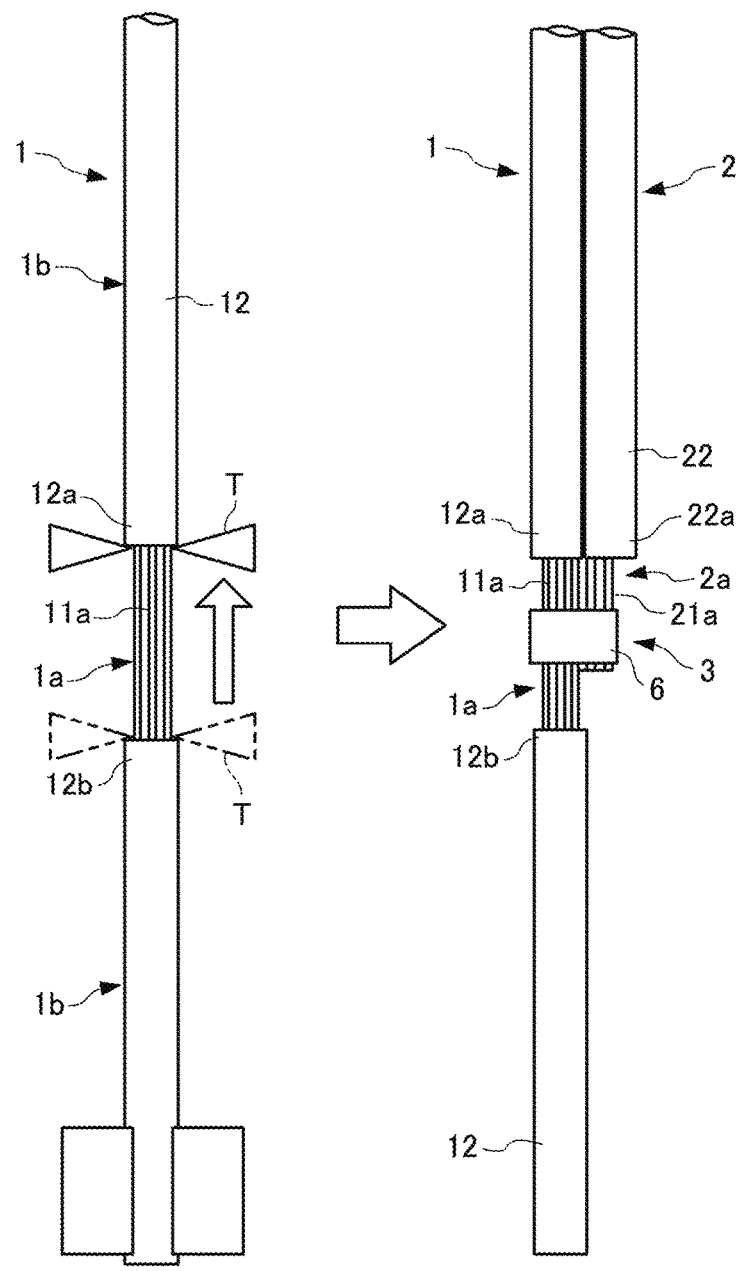
FIG. 2 is a diagram illustrating a manufacturing procedure for a splice portion of a wire harness that employs the wire harness waterproof structure according to the embodiment of the present invention.

As shown in FIGS. 1 and 2, the wire harness waterproof structure of the present embodiment includes a wire harness W that has multiple electrical lines 1 and 2 (insulated sheathed electrical lines) and other electrical lines (not shown) that form a bundled electrical line group, and the wire harness W is provided in a waterproofing section Zs in the vicinity of an intermediate splice portion 3 that joins the electrical lines 1 and 2.

The electrical lines 1 and 2 are respectively constituted by conductors 11 and 21, which are bundles of conductor element wires for example, and coverings 12 and 22 that concentrically surround the conductors 11 and 21.

The conductors 11 and 21 are constituted by circular stranded wires obtained by twisting together multiple annealed copper wires, for example, but do not need to be twisted wires. Also, the coverings 12 and 22 are constituted by insulating tubes made of a resin whose main component is vinyl chloride resin, for example.

As shown in FIG. 2, the electrical lines 1 and 2 respectively have exposed conductor portions 1a and 2a, in which portions of the conductors 11 and 21 are exposed from the coverings 12 and 22, and insulated covered portions 1b and 2b that are insulated by the coverings 12 and 22, and the intermediate splice portion 3 is formed by the exposed conductor portions 1a and 2a being integrally joined together.

Specifically, the exposed conductor portion 1a of the electrical line 1 is obtained by using a covering stripping tool T to strip away a portion of the covering 12 in an intermediate portion of the electrical line 1 in the length direction (portion separated from the two end portions) to expose a portion 11a of the conductor 11 to the outer side of the covering 12, and thus a pair of adjacent end portions 12a and 12b of the covering 12 are arranged separated from each other by a predetermined distance in the axial direction so as to be adjacent to the two end sides of the exposed conductor portion 1a.

Also, the exposed conductor portion 2a of the electrical line 2 is obtained by stripping away a portion of the covering 22 in one end portion of the electrical line 2 in the length direction, and exposing one end portion 21a of the conductor 21 outside of the covering 22, and thus an adjacent end portion 22a on one end side of the covering 22 is formed so as to be adjacent to the exposed conductor portion 2a.

The intermediate splice portion 3 is obtained by using a crimping terminal 6 or ultrasonic welding to integrally join together the portions 11a and 21a of the conductors 11 and 21 in the exposed conductor portions 1a and 2a of the electrical lines 1 and 2.

Figure 3:
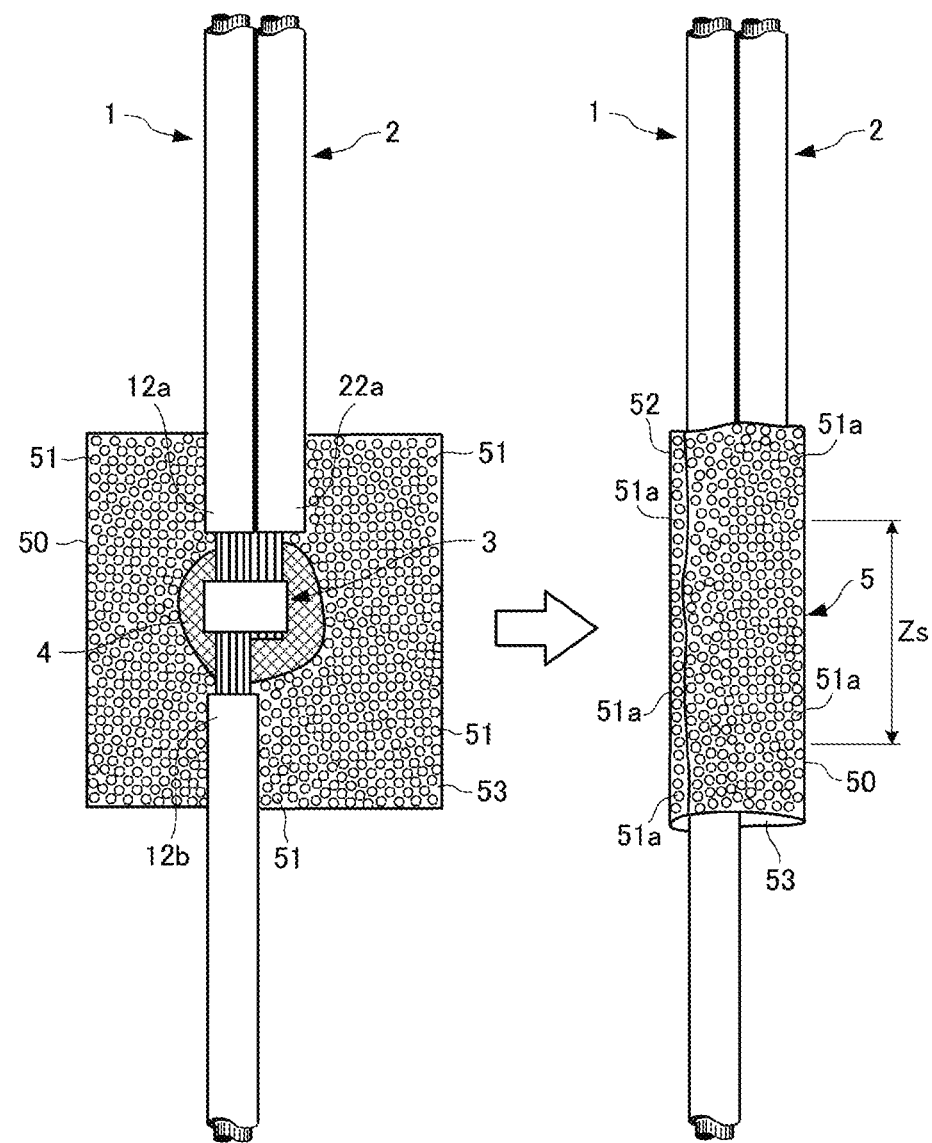
FIG. 3 is a diagram illustrating a procedure for forming the wire harness waterproof structure according to the embodiment of the present invention, and shows a stage in which uncured water sealant and a sheet material are arranged around the splice portion, and a stage in which the sheet material is wrapped around the waterproofing section of the electrical line so as to surround the splice portion.

As shown in FIGS. 1 and 3, a light-permeable (e.g., transparent) exterior member 5 is provided so as to completely surround the entire circumference of the intermediate splice portion 3 and the adjacent end portions 12a, 12b, and 22a of the coverings 12 and 22 that are adjacent to the intermediate splice portion 3, and a curing layer 40 made up of a water sealant 4 is provided between the intermediate splice portion 3 and the exterior member 5.

The curing layer 40 made up of the water sealant 4 is formed by a moisture-curing silicon-based polymer that has fluidity, for example, and the water sealant 4 in the uncured state is a transparent fluid such as liquid silicon rubber, for example, and is in a liquid state having a certain viscosity (need only be a fluid having a viscosity near the certain viscosity). Also, the uncured water sealant 4 gradually undergoes curing from the outside toward the curing layer 40 that can exhibit predetermined rubber elasticity, due to coming into contact with air that contains moisture in a room-temperature space. Note that exhibiting predetermined rubber elasticity means that the curing layer 40 has elasticity like rubber to the extent of being able to follow deformation of the intermediate splice portion 3.

The exterior member 5 is formed by a transparent and waterproof sheet material 50 that curves so as to surround the intermediate splice portion 3 and the adjacent end portions 12a, 12b, and 22a of the coverings 12 and 22.

Also, the sheet material 50 has multiple seeping holes 51 that penetrate in the sheet thickness direction with a predetermined pitch.

Multiple seeping holes 51 allow seeping such that a portion 41 of the curing layer 40 exists at points on an outer surface 52 of the exterior member 5, as shown by white circles (blank circles) in FIG. 1, in a filled region that is in the periphery of the intermediate splice portion 3 and is filled with the water sealant 4 with a predetermined filling pressure or higher.

Also, multiple seeping holes 51 are open in an unfilled region, which has not been filled with the water sealant 4 or is in an insufficient filling state with a filling pressure below the predetermined filling pressure for example, in order to enable the drainage of moisture to the outer surface 52.

The sheet material 50 of the exterior member 5 is constituted by a shape-memory resin formed in a final shape in which the seeping holes 51 are open as shown by the partial enlarged view on the bottom side in FIG. 4 at a molding temperature greater than or equal to the glass transition point, for example, and the shape-memory resin returns to the final state in the exterior member 5 upon being heated for shape reversion in a later-described waterproofing processing step.

Figure 4:
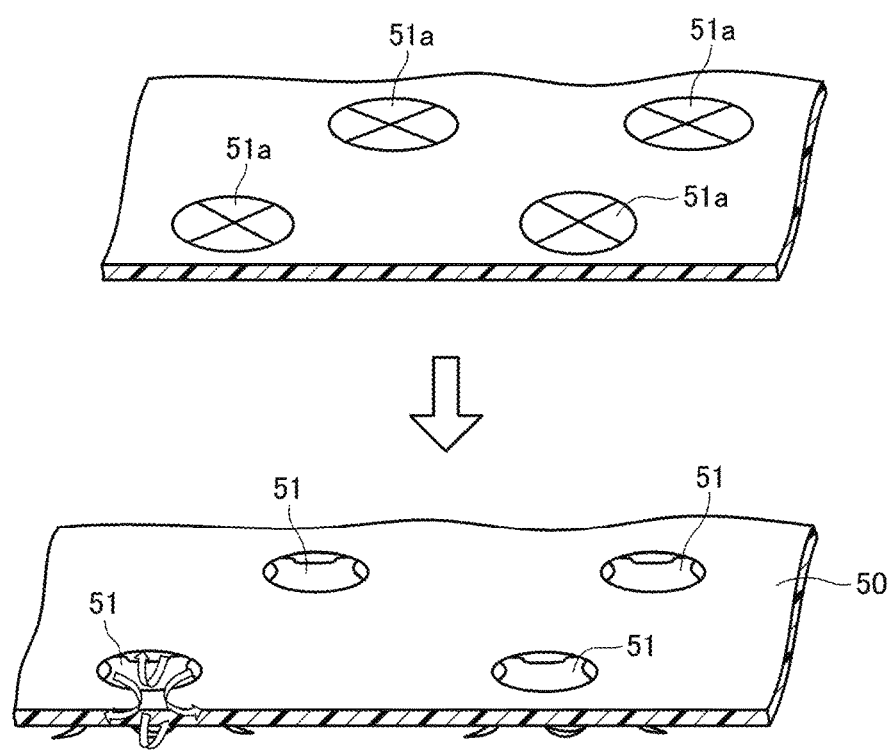
FIG. 4 is a diagram illustrating a procedure for forming the wire harness waterproof structure according to the embodiment of the present invention, and more specifically is a partial enlarged perspective view of a stage in which the sheet material made of a shape-memory resin returns from the material shape in which the seeping holes are closed to the final shape in which the seeping holes are open.

Also, the sheet material 50 is shaped into a remembered shape 51a in which the seeping holes 51 are closed as shown by the partial enlarged view on the top side in FIG. 4 at a predetermined fabricating temperature that is lower than the molding temperature and within the shape memory temperature range, and this remembered shape 51a is kept in the material state (the state before heating for shape reversion).

The curing speed of the moisture-curing uncured water sealant 4 increases after having seeped to the outer surface 52 of the exterior member 5, and thus the amount of water sealant 4 that seeps up to the outer surface 52 is suppressed to a small amount.

Also, as shown on the left side in FIG. 3, the uncured water sealant 4 and the sheet material 50 of the exterior member 5 are arranged in the periphery of the intermediate splice portion 3, and then when the sheet material 50 is curved so as to surround the intermediate splice portion 3 of the electrical lines 1 and 2, the periphery of the intermediate splice portion 3 is filled with the uncured water sealant 4 on the inner side of the sheet material 50 in a state in which the containing space formed between the sheet material 50 and the intermediate splice portion 3 is restricted.

Furthermore, the sheet material 50 of the exterior member 5 is formed by a polyurethane-based shape-memory resin, for example, and when the sheet material 50 is wrapped around the waterproofing section Zs of the electrical lines 1 and 2, pressure can be applied to the water sealant 4 by the tensile force acting in the sheet material 50.

Accordingly, by heating the exterior member 5 to approximately the fabricating temperature or higher in order to open the seeping holes 51 with a predetermined pitch quickly after the wrapping of the sheet material 50, the water sealant 4 can be caused to seep through the seeping holes 51 according to the filling state of the water sealant 4.

Note that the exterior member 5 is constituted by the sheet material 50 that curves so as to surround the intermediate splice portion 3, and although shown in the approximately cylindrical shape in FIG. 1, the sheet material 50 is an adhesive sheet that has an adhesive surface on an inner circumferential surface 53, for example. Accordingly, an end edge portion 54a on the wrapping beginning side and an end edge portion 54b on the wrapping ending side can be adhered to each other, and the sheet material 50 can be adhered to the outer circumference of the coverings 12 and 22 of the electrical lines 1 and 2 on the two end sides of the cylindrical wrapped shape of the sheet material 50.

Note that the end edge portion 54a on the wrapping beginning side of the sheet material 50 and the end edge portion 54b on the wrapping ending side may be taped down or adhered, and the sheet material 50 may be taped down on the two end sides of the cylindrical wrapped shape.

Next is a description of a procedure for performing waterproofing processing on the intermediate splice portion 3 in the wire harness W of the present embodiment.

First, the intermediate splice portion 3 is formed on the electrical lines 1 and 2 as shown in FIG. 2.

Next, as shown on the left side in FIG. 3, uncured water sealant 4 is applied to either the intermediate splice portion 3 or the sheet material 50, or to both of them, and then the sheet material 50 is wrapped around the waterproofing section Zs of the electrical lines 1 and 2 so as to surround the intermediate splice portion 3 as shown on the right side in FIG. 3.

At this time, the space that contains the water sealant 4 (not shown) is restricted between the sheet material 50 and the intermediate splice portion 3, and the periphery of the intermediate splice portion 3 is filled with the fluid-state water sealant 4.

Also, appropriate filling pressure is applied to the water sealant 4 by tensile force acting in the sheet material 50 during wrapping around the waterproofing section Zs.

During this time, the sheet material 50 is maintained in the remembered shape in which the seeping holes 51 are closed as shown in the partial enlarged view on the top side in FIG. 4.

Next, heat processing for causing the sheet material 50 to undergo shape reversion to the final shape is performed on the waterproofing section Zs of the electrical lines 1 and 2, and due to this heating, the sheet material 50 returns to the final shape in the exterior member 5, that is to say returns to the shape in which the seeping holes 51 are open.

In this state, the seeping holes 51 that are open in the water sealant 4 filling region allow seeping such that the water sealant 4 exists at points on the outer surface 52 of the sheet material 50 of the exterior member 5, as shown by the white circles in FIG. 1. On the other hand, the seeping holes 51 that are open in the region not filled with the water sealant 4 are open so as to enable moisture to be drained from the interior to the outer surface 52 of the sheet material 50.

The curing speed of the moisture-curing uncured water sealant 4 increases when it seeps to the outer surface 52 of the exterior member 5, and thus the water sealant 4 overall undergoes curing gradually over time from the outside, thus forming the curing layer 40.

Next, actions of the present embodiment will be described.

In the wire harness waterproof structure of the present embodiment having the configuration described above, the amount of uncured water sealant 4 that seeps up to the outer surface 52 of the sheet material 50 is extremely small, but since the water sealant 4 undergoes curing gradually over a predetermined period of time rather than instantaneously, the scattered state of the seeping portions and the seeping amount thereof changes according to the water sealant 4 filling state.

The water sealant 4 is transparent in this example, and therefore when it seeps through the seeping holes 51 and undergoes curing, it becomes cloudy relative to the transparent surface of the exterior member 5 therebelow, thus making it possible to easily see the scattered state of the seeping portions.

In the present embodiment, the water sealant 4 filling state can be easily visually checked from the outside by visually checking the water sealant 4 that has seeped so as to exist at points on the outer surface 52 of the exterior member 5 according to the water sealant 4 filling state in the periphery of the intermediate splice portion 3 of the wire harness W.

Figure 5:
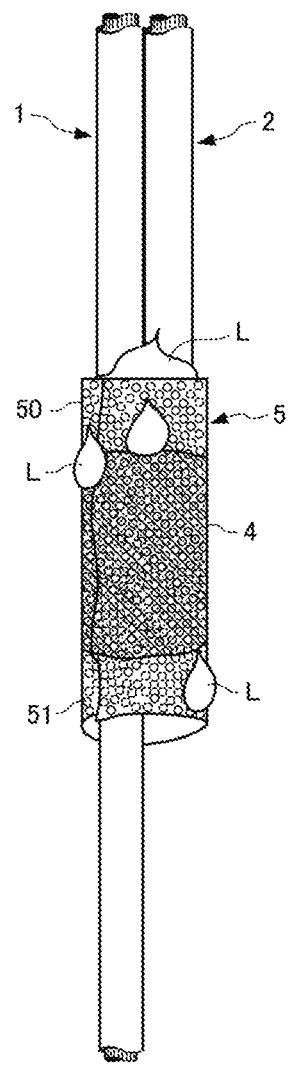
FIG. 5 is a diagram illustrating actions of the wire harness waterproof structure according to the embodiment of the present invention.

Also, as shown in FIG. 5, even if water L enters the water sealant 4 unfilled region, it can be easily drained through the seeping holes.

Furthermore, the viscosity, curing speed, and the like of the water sealant 4, as well as the thickness of the sheet material 50 that defines the hole diameter of the seeping holes 51 and the length of the seeping holes, are set appropriately such that during the wrapping of the sheet material 50 of the exterior member 5, the water sealant 4 is compressed with a predetermined filling pressure or more due to the wrapping tensile force (furthermore, appropriate constricting force may be applied) so as to seep toward the outer surface 52 side of the exterior member 5, and in this case, it is possible to reliably fill the periphery of the intermediate splice portion 3 with the water sealant 4 without using a large amount of water sealant.

Additionally, in the present embodiment, when the sheet material 50 of the exterior member 5 is wrapped around the intermediate splice portion 3 of the electrical lines 1 and 2, the material shape in which the seeping holes 51 are closed is maintained, and then upon reaching the stage at which appropriate pressure is applied to the water sealant 4 from the sheet material 50 side, the sheet material 50 is heated to a temperature at which it can return to the final shape, and the seeping holes 51 are opened. Accordingly, the filling state in which the water sealant 4 penetrates the gaps between the element wires constituting the conductors 11 and 21 and the gaps between the conductors 11 and 21 and the coverings 12 and 22 can be visually checked based on the seeping state of the water sealant 4.

In this way, in the present embodiment, it is possible to realize a waterproof structure that enables the water sealant 4 filling state in the periphery of the intermediate splice portion 3 to be easily visually checked from outside the exterior member 5, that enables reliably filling the periphery of the intermediate splice portion 3 with the water sealant 4 without using a large amount of water sealant 4, and also enables water that has entered an unfilled region to be easily drained.

Note that in the above embodiment, the sheet material 50 is illustrated as a square sheet as shown in FIG. 3, but it may be formed in a strip shape and wrapped in a spiral manner around the periphery of the intermediate splice portion 3.

Also, the exterior member 5 curves into a tubular shape that surrounds the intermediate splice portion 3 of the electrical lines 1 and 2 and has two open ends, but in the case where the electrical lines 1 and 2 are both formed similarly to the electrical line 2 in the figures, and a terminal splice portion is constituted instead of an intermediate splice portion 3, the exterior member 5 may be shaped as a bottomed tube having one closed end.

Of course, the opening shapes and opening sizes of the one end side and the other end side of the sheet material 50 wrapped into a tubular shape may be different from each other.

As described above, according to the present invention, it is possible to provide a wire harness waterproof structure that enables the water sealant filling state in the periphery of the splice portion to be easily visually checked from outside the exterior member, that enables reliably filling the periphery of the splice portion with the water sealant without using a large amount of water sealant, and also enables water that has entered an unfilled region to be easily drained. The present invention is generally useful to wire harness waterproof structures that are suitable for the intermediate splice portions of wire harnesses.

The invention claimed is:

1. A wire harness waterproof structure comprising:
    a plurality of electrical lines each having an insulated covered portion insulated by a covering and an exposed conductor portion obtained by partially stripping away the covering, the plurality of electrical lines forming a splice portion by the exposed conductor portions being joined together;
    an exterior member that surrounds the entire circumference of the splice portion and a plurality of adjacent end portions of the coverings that are adjacent to the splice portion; and
    a curing layer made up of a water sealant with which a gap between the splice portion and the exterior member is filled,
    wherein the exterior member is formed by a waterproof sheet material that is curved so as to surround the splice portion and the adjacent end portions of the coverings, and
    the sheet material has a plurality of seeping holes that penetrate in a thickness direction with a predetermined pitch so as to extend generally radially from the splice portion, wherein some of the plurality of seeping holes are filled by a portion of the curing layer and some of the plurality of seeping holes are open to the curing layer so as to enable moisture to be drained to the outer surface.

2. The wire harness waterproof structure according to claim 1, wherein the sheet material is constituted by a shape-memory resin that is formed in a final shape in which the plurality of seeping holes are open at a molding temperature greater than or equal to a glass transition point, and returns from a material shape, which is a remembered shape in which the seeping holes are closed in a shape memory temperature region lower than the molding temperature, to the final shape in the exterior member.

3. The wire harness waterproof structure according to claim 1, wherein the splice portion of at least one electrical line among the plurality of electrical lines is arranged in an intermediate portion in a length direction of the at least one electrical line.

4. The wire harness waterproof structure according to claim 2, wherein the splice portion of at least one electrical line among the plurality of electrical lines is arranged in an intermediate portion in a length direction of the at least one electrical line.

* * * * *